(12) United States Patent
Cohen et al.

(10) Patent No.: US 6,971,973 B2
(45) Date of Patent: Dec. 6, 2005

(54) CUSTOM CONTENT DELIVERY FOR NETWORKED EXERCISE EQUIPMENT

(75) Inventors: Michael Alvarez Cohen, Berkeley, CA (US); Jeffrey P. Cahn, Half Moon Bay, CA (US)

(73) Assignee: Netpulse, LLC, Atherton, CA (US)

( * ) Notice: Subject to any disclaimer, the term of this patent is extended or adjusted under 35 U.S.C. 154(b) by 220 days.

(21) Appl. No.: 09/866,320

(22) Filed: May 24, 2001

(65) Prior Publication Data

US 2001/0051559 A1 Dec. 13, 2001

Related U.S. Application Data

(60) Provisional application No. 60/206,841, filed on May 24, 2000.

(51) Int. Cl.[7] ............................................. A63B 21/00
(52) U.S. Cl. ................................ 482/8; 482/1; 482/900
(58) Field of Search .................... 482/1–9, 51, 900–902

(56) References Cited

U.S. PATENT DOCUMENTS

| | | | |
|---|---|---|---|
| 5,645,509 A | | 7/1997 | Brewer et al. ................. 482/44 |
| 5,888,172 A | * | 3/1999 | Andrus et al. ................. 482/7 |
| 5,890,997 A | * | 4/1999 | Roth ............................. 482/8 |
| 5,984,839 A | | 11/1999 | Corkum ........................ 482/54 |
| 6,053,844 A | * | 4/2000 | Clem ............................ 482/8 |
| 6,312,363 B1 | | 11/2001 | Watterson et al. |
| 6,575,878 B1 | | 6/2003 | Choy |

OTHER PUBLICATIONS

Netpulse Makes Working Out More than a Calorie Burning Session, pp. 1–2, Mar. 1998.
Netpulse 24 Hour Fitness Partners with Netpulse, Press Release from Internet, p. 1, Mar. 1998.
"In the world of fitness, where eles can you go?", Transcape Systems, Inc., brochure, 6 pages, 1996.
"Ice Stations by Transcape Systems," Transcape Systems, brochure, 2 pages, 1997.
"Catch the WWWave," Netpulse brochure, 6 pages, 1998.
"Netpulse Internet Fitness Network," Netpulse Communications, Inc. brochure, 4 pages, 1999.
Stevens, "For Netpulse, Its No Pain, No Gain," 3 pages, Feb. 2, 2000, downloaded from http://www.turboads.com/broadband/2000news/bn20000202.shtml.
Gaffney, "Featuring Tom Proulx, CEO Netpulse," 3 pages, Nov. 12, 1999, downloaded from http://www.channelseven.com/newsbeat/99features/seven19991112.shtml.
Manning, "Net gear for health clubs let you surf while you sweat," The Courier Journal, 2 pages, Apr. 15, 2000, downloaded from http://www.courier-journal.com/gizweb/cols/00/0004c.htm.

(Continued)

*Primary Examiner*—Glenn E. Richman
(74) *Attorney, Agent, or Firm*—Fish & Richardson P.C.

(57) ABSTRACT

Aspects of the present invention, provide customized content to a consumer on a network-enabled exercise device, include providing an exercise device having a display console, the exercise device being connected to a network, receiving user profile information associated with a consumer operating the exercise device, receiving content information identifying available content for display on the display console, the content information including selection criteria for selecting content to be displayed from the available content, selecting content for display to the consumer based on the content information and the user profile information; and presenting an impression of the selected content to the consumer on the display console.

45 Claims, 13 Drawing Sheets

OTHER PUBLICATIONS

Papamichael, "Turn Exercise into Entertainment," MBS Gazette Newsletter, 4 pages, Mar./Apr. 2000., downloaded from http://www.bodyscenes.com/newsletter_files/mar_apr_2000/nwsltr34001.htm.

Knefel, "Working out with the Web," CNN.com, May 15, 1998, downloaded from http://web.archive.org/web/20010210193946/ww.netpulse.net/press/articles19980515.html.

"Surf the Net While You Sweat,"6 MSNBC, 3 pages, Sep. 28, 1999, downloaded from http://zdnet.com.com/2100-11_2-515822.html.

King, "Health Club Marketing: They Lose, You Win," NewsBeat Channel Seven, 3 pages Sep. 13, 2000, downloaded from http://www.channelseven.com/newsbeat/2000features/news20000913.shtml.

RHC Media, Inc., "Down on Devices," Dec. 1998, downloaded from http://216.239.57.104/search?q=cache:tKkX_SliLawJ:www.redherring.com/mag.

Seglin, "Diss Connection," Inc. Magazine, 3 pages, Mar. 1999, downloaded from http://www.inc.com/magazine/19990301/4557.html.

McCafferty, "An exercise in utility," USA Weekend Magazine, 4 pages, May 7, 2000, downloaded from http://www.usaweekend.com/00_issues/000507/000507tech.html.

Hudgens "In Motion, Logging On to Work Out," Kiosks.Org Association, , 4 pages, Nov. 12, 1999, downloaded from http://216.239.57.104/search?q=cache:b–0z0cz9zjOJ:www.kiosks.org/newsbit.

Horowitz, "New Tipsy Tests for Suspected Drunks," Newsmax, 3 pages, May 24, 1999, downloaded from http://www.newsmax.com/commentarchive.shtml?a=1999/5/23/225736.

"Work the Web," Ibiz Magazine, 4 pages, Sep. 1998, downloaded from http:///www.ibiz.net/sep98/workx.htm.

Tucker, MyWellness Solutions, "Interactive Profits," Fitness Management Magazine, vol. 13, p. 38, May 1997, downloaded from http://216.239.57.104/search?q=cache:6WvXqe4flZgJ:www.mywellness.com/def.

Hemmila, "An irresistable pitch," San Francisco Business Times, , 3 pages, Apr. 20, 1998, downloaded from http://sanfrancisco/bizjournals.com/sanfrancisco/stories/1998/04/20/newscolumn4.html.

Kelley, "Patient, Heal Thyself," Context Magazine, 6 pages, Fall, 1998, downloaded from http://www.contextmag.com/setFrameRedirect.asp?src=/archives/199809/virtualHorizons.asp.

Tucker, Fitness World, "VIRTUAL Support," Fitness Management Magazine, vol. 14, pp. 40–41, 3 pages, Jul. 1998, downloaded from http://www.fitnessworld.com/info/info_pages/library/service/service0798.html.

Burres, "The Fitness Center of the Future," 5 pages, Feb. 1995, downloaded from http://www.drkenburres.com/drkenburres.doc.

Furchgott, Business Week, "The Best Products of 1999," 11 pages, Dec. 20, 1999.

Netpulse–Club Members & Exercisers, "Surf the web while you workout," 2 pages, 1998, downloaded from http://web.archive.org/web/19990221052049/www.netpulse.com/Members0.html.

Netpulse–Advertisers, "Reach captive exercisers at the point of sweat," 1 page, 1998, downloaded from http://web.archive.org/web/19990220134130/www.netpulse.com/Advertisers0.html.

"Netpulse Delivers Captive, Upscale Audience For Online, Rich–Media Advertising," Netpulse press release, Mar. 1, 1999, downloaded from http://web.archive.org/web/20010119103700/www.netpulse.net/press/releases19990301.html.

Donnelly, "Networkingout—Coming Distractions: Netpulse Helps Exercisers Surf the Net at the Gym, Accomplish Several Goals at Once," The San Jose Mercury News, Silicon Valley Life, p. 1E, Apr. 1, 1998, downloaded from http://web.archive.org/web/20010111131100/www.netpulse.net/press/articles19980401.html.

Chen, "Web–connected exercise machines let club patrons surf while stair–stepping," The New York Times, CCT, Section: E, p.: 1, Jun. 30, 1998, downloaded from http://web.archive.org/web/20010210195023/www.netpulse.net/press/articles19980630.html.

Martin, "Ultrawired," Fortune Magazine, Aug., 1998, downloaded from http://web.archive.org/web/20010111134700/www.netpulse.net/press/articles19980800.html.

Onion, "High–Tech Health Clubs Make Members Work Hard for Their Daily Media Fix," Fox News, Nov. 13, 1998, downloaded from http://web.archive.org/web/20010111143600/www.netpulse.net/press/articles19981113.html.

Fauber, "New Fitness Equipment Combines Internet, Sweat," Milwaukee Journal Sentinel, Jan. 3, 1999, downloaded from http://web.archive.org/web/20010210193809/www.netpulse.net/press/articles19990103.html.

Creager, "Bikes let you surf Web, pedal towards perks," Detroit Free Press, Apr. 23, 1999, downloaded from http://web.archive.org/web/20001110135700/www.netpulse.net/press/articles19990423.html.

McCombs, "Web–Surfing Workouts: A New Way to Do It All at Once," Washington Post, p. C01, Jul. 9, 1999, downloaded from http:web.archive.org/web/20010210212445/www.netpulse.net/press/articles19990709.html.

Stein, "Surfing the Net while you sweat," USA Today, Sep. 28, 1999, downloaded from http://web.archive.org/web/20010110122400/www.netpulse.net/press/articles19990928b.html.

Blake, "Working Out On The Web," The Atlanta Journal–Constitution, Dec. 2, 1999, downloaded from http://web.archive.org/web/20010110130600/www.netpulse.net/press/articles19991202.html.

"CRUNCH Logs On with Netpulse," Netpulse Press Release, Sep. 1, 1998, downloaded from http://web.archive.org/web/20010119104300/www.netpulse.net/press/releases19980901.html.

"Netpulse Helps California Campaigns Target Health Club Voters "While They Sweat"," Netpulse Press Release, Oct. 7, 1998, downloaded from http://web.archive.org/web/20010119102900/www.netpulse.net/press/release19981007.html.

* cited by examiner

CUSTOM CONTENT DELIVERY FOR NETWORKED EXERCISE EQUIPMENT

CROSS-REFERENCE TO RELATED APPLICATION

This application claims the benefit of U.S. Provisional Application No. 60/206,841, filed on May 24, 2000, which is incorporated by reference herein.

TECHNICAL FIELD

This invention relates to exercise equipment and computer networking.

BACKGROUND

In the exercise industry, a relatively homogenous group of people frequent fitness centers and use exercise equipment. These people include fitness-minded individuals in the middle to upper income level with a concern about their health. Currently, there is not an effective way to tailor the marketing of products and services to these individuals based upon their common interest in fitness and frequent visits to the gym. Accordingly, fitness centers generate little or no marketing revenue for advertising additional products and services to their membership.

Conversely, the Internet provides a conduit for delivering marketing and other information however does not provide an efficient way to tie marketing information with a homogenous group of individuals. Unfortunately, many portals and other websites have attempted to do this without much success. The costs associated with large advertising campaigns on television, radio and even the Internet urging people to visit a website often exceed any revenue stream they could reasonably generate. In particular, there are no existing systems capable of tying together customers in the exercise industry with the power and direct marketing capabilities of the Internet.

Others have clearly failed to recognize the capabilities of using the Internet in the fitness industry and with fitness equipment. Specifically, U.S. Pat. No. 5,645,509 concerns controlling exercise equipment remotely and U.S. Pat. No. 5,984,839, merely aggregates existing functions on a computer connected to the Internet with an exercise bicycle.

SUMMARY

In one aspect of the invention, a method for providing customized content to a consumer on a network-enabled exercise device, includes providing an exercise device having a display console, the exercise device being connected to a network, receiving user profile information associated with a consumer operating the exercise device, receiving content information identifying available content for display on the display console, the content information including selection criteria for selecting content to be displayed from the available content, selecting content for display to the consumer based on the content information and the user profile information; and presenting an impression of the selected content to the consumer on the display console.

Aspects of the invention provide at least one or more of the following advantages.

Users can enter personal information and automatically configure a list of content customized to their interests. This content is displayed on a display device associated with an exercise device and can be readily accessed. The user does not have to configure the user interface on the exercise device and can quickly receive information of interest such as reading favorite newspapers or reading about certain topics of particular interest. Customized content is also advantageous to parties advertising their products or services, providing e-commerce transactions, or engaging in other types of e-marketing events. These e-marketers can provide e-marketing campaigns specifying the qualities associated with the types of users they are trying to reach in the marketplace. The customized content delivery matches the e-marketing campaigns with the users meeting the specifications and delivers these tailored e-marketing campaigns to the display device associated with the exercise equipment. This improves the success rates of such e-marketing campaigns as the interests of the users are well-known and the e-marketers know the background and interests of their audience.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
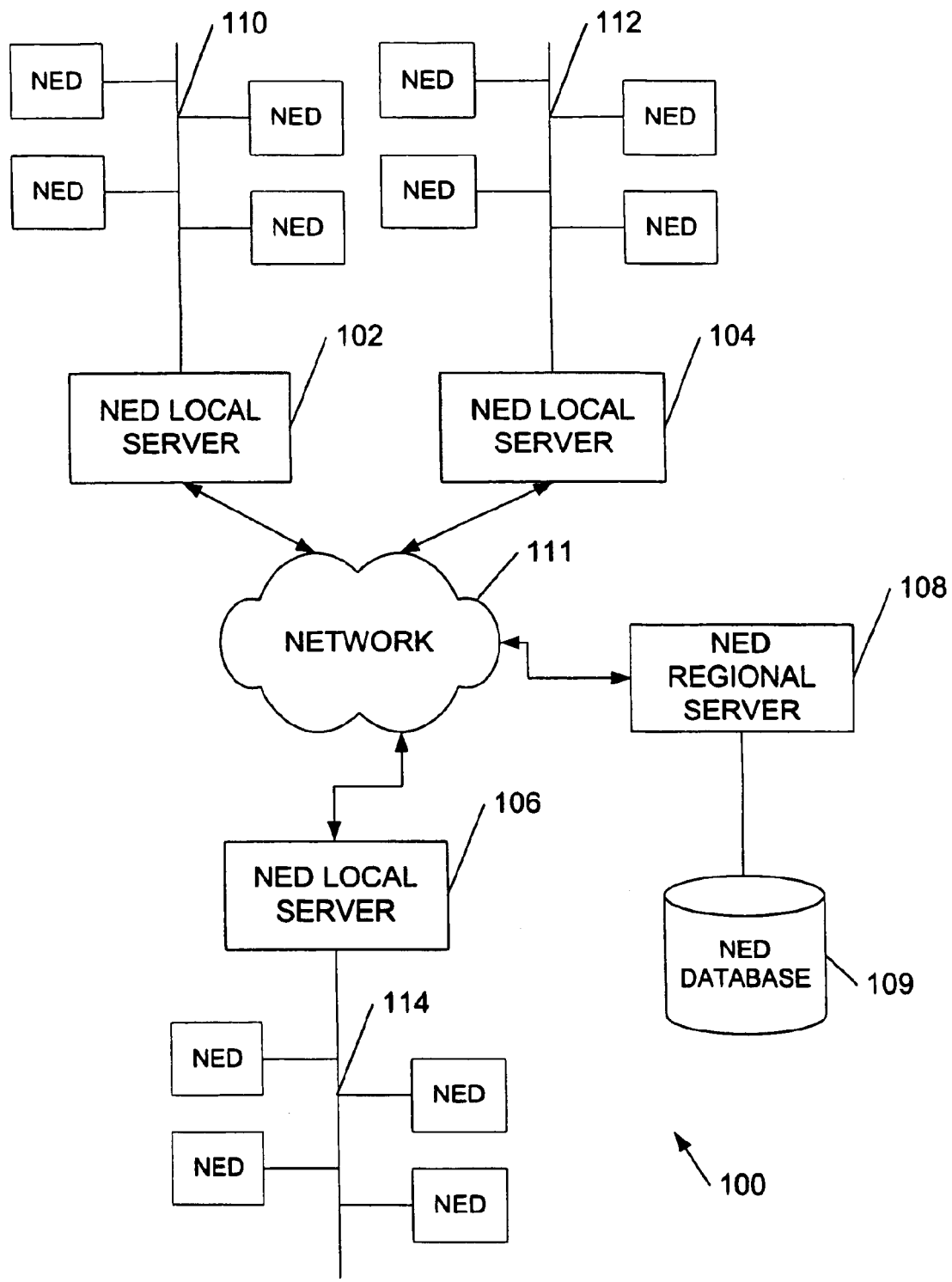
FIG. 1 is a block diagram depicting numerous network-enabled exercise devices (NED) connected to a network.

FIG. 1 is a block diagram depicting numerous network-enabled exercise devices (NED) connected to a network 111. In one implementation, network 111 facilitates communication between NED local server 102, NED local server 104, NED local server 106, and NED regional server 108. Each NED local server 102, 104, and 106 are located in relative close proximity to a set of NEDs. For example, NED local server 102 can be a general-purpose computer running a multi-tasking and multi-user operating system to manage resources used by NEDs connected to local network 110. Functions performed by NED local server 102 can include a variety of functions such as providing long-term storage for NEDs, temporary caching storage for processes running on NEDs, and operating as a router device transmitting packets between the NEDs and NED regional server 108 over network 111.

Alternatively, network local server 102 can be a dedicated router designed specifically to route packets between NEDs on local network 110 and network 111. NED local server 104 and NED local server 106 provide similar functionality for NEDs connected to local area network 112 and local area network 114 respectively.

NED regional server 108 is a clearinghouse for information generated by NEDs connected to NED local server 102, NED local server 104, and NED local server 106. For example, information transmitted from a NED connected to local area network 110 passes through NED local server 102 and network 111 for further processing by NED regional server 108. Information processed by NED regional server 108 is stored on NED database 109 for future reference. The processing performed by NED regional server 108 includes statistical analysis of information, tracking personal preferences and workout routines for individuals using the NEDs, managing delivery of content to NEDs, and optionally managing operation of NEDs remotely.

Information in NED database 109 is an integral component of system 100. NED database 109 includes raw information concerning a user's exercise activity as well as use of the Internet, television, advertisements, and electronic-commerce (e-commerce). In addition, it also includes statistical information such as demographics and psychographics describing the population of users exercising while accessing the Internet and other sources of information.

From a user's standpoint, Internet access enhances each exercise activity and provides additional information previously unavailable. For example, users can store their exercise history and engage in sophisticated training programs using a combination of software loaded on the NED and the Internet. Further, users can also engage in traditional functions available on the Internet and the World Wide Web such as gathering daily news from an on-line newspaper, reading emails, and listening to music, all while exercising on the NED.

Companies marketing products and services through the NED also gain additional efficiencies and benefits. These businesses have an immediate channel to market their goods and services to a captive audience with a well-known demographic makeup. By actively collecting information voluntarily from each user and passively through the exercise regimen each practices, future on-line behavior and spending patterns can be more readily predicted. Additionally, information collected while the users access the Internet can also be used to better understand their personal interests and hobbies. For example, NED regional server 108 can generate statistically significant correlations between users and their commercial preferences by tracking the web-sites they visit and the click-through hypertext links they access while exercising.

Figure 2:
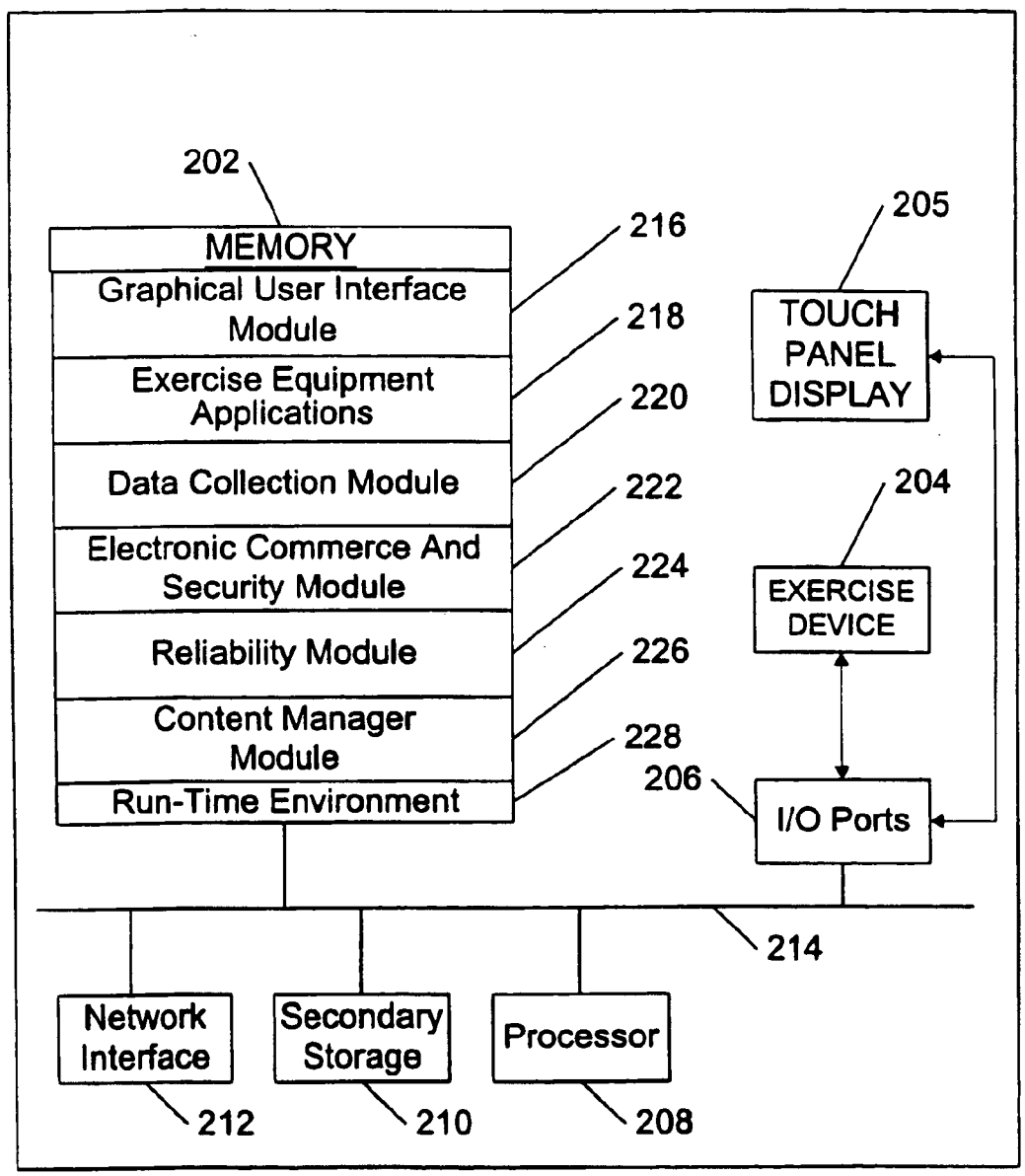
FIG. 2 is a block diagram illustrating the architecture of an exemplary NED as shown in FIG. 1.

FIG. 2 is a block diagram illustrating the architecture of an exemplary NED as shown in system 100 in FIG. 1. In one implementation, a NED includes a memory 202, an exercise device 204 connected to input/output ports 206, a touch-panel display 205 also connected to input/output ports 206, a processor 208, a secondary storage 210, and a network interface 212 all connected together by bus 214. I/O ports 206 gather information from exercise device 204 and display the information on touch panel display 205. The NED can also be produced as a thin-client with lower costs and functionality by eliminating larger and/or more expensive components such as secondary storage 210. For example, instead of storing information locally on secondary storage 210, the thin-client NED stores information over a network on a storage device.

The design of NED is modular and uses numerous commercially available off-the-shelf devices for ease of integration and cost effectiveness. Accordingly, I/O ports 206 are programmed to communicate with conventional exercise device 204 and touch panel display 205 using interfaces accepted in the exercise device industry. For example, I/O ports 206 communicate with exercise device 204 using standard physical serial interface protocols such as IEEE RS232 communications and other communication protocol such as the CSAFE communications standard typically used in the exercise device equipment industry. Touch-panel display 205 accepts input when user operates exercise device 204 and controls the various features on the exercise equipment. For example, touch-panel display 205 can be used to increase or decrease the resistance on a bicycle-type exercise device. It may also be used to control other aspects of exercise device 204 such as the duration of the session, the selection of a simulated terrain and/or the difficulty level associated with operating the device. Alternate implementations can control the NED using other types of control devices in conjunction with or in lieu of touch panel display 205 such as a touch pad, a track ball, or voice activation.

Processor 208 can be a general-purpose processor such as a Pentium or X86 compatible processor developed by Intel Corporation of Santa Clara. Secondary storage 210 can be a disk drive, CD-ROM, or any other storage device used for long term storage of information. Network interface 212 provides access to a network such as the Internet through a variety of physical and logical network protocols including, for example, TCP/IP and Novel NetWare.

Memory 202, I/O ports 206, processor 208, secondary storage 210, and network interface 212 can be packaged in a standard form-factor such as a personal computer and integrated with existing exercise device 204 and touch panel display 205 or other control devices as discussed above. This modular approach of integrating existing exercise equipment with a computer provides a cost-effective and reliable platform for accessing a large network such as the Internet. Alternatively, these various components can be integrated into a customized exercise device. For example, components such processor 208, secondary storage 210, network interface 212, can be integrated into an existing printed circuit board design already in use on existing exercise devices. This design integrated design is particularly useful if large volumes of the NEDs are manufactured.

When a user operates the NED, a variety of processes execute in memory 202 including a graphical user interface (GUI) module 216, exercise equipment applications 218, a data collection module 220, an electronic commerce and security module 222, a reliability module 224, a content manager module 226, and a run-time environment 228. GUI module 216 provides a specially designed user interface for the user to control a NED during exercise and access content-rich information on a network such as the Internet. GUI module 216 includes features specially designed to operate with touch-panel display 205 while a user is engaged in cardiovascular exercise. As will be discussed in further detail below, GUI module 216 facilitates easy access to the Internet and associated websites by enhancing hypertext links, Internet browser controls, and other selectable content. For example, GUI module 216 facilitates easier control of exercise device 204 through touch panel display 205 by adjusting the size and location of the control buttons.

Exercise equipment applications 218 include a variety of applications. These applications can be used by a user operating the NED, an exercise facility providing access to one or more NEDs, or a NED service provider company managing personal information on users and generating demographic information through NED regional server 108. These exercise equipment applications 218 include providing users with database applications for storing their workout histories as well as suggesting specific workout programs for their particular exercise needs. Users can also utilize exercise equipment applications 218 to manage their access to the Internet and engage in e-commerce transactions. For example, exercise equipment applications 218 can seek out websites and other locations on the Internet with information tailored to a person's specific interests such as a schedule of sporting events or new techniques for improving one's performance in various athletic events.

Exercise equipment applications 218 can also be used in conjunction with systems for managing operations and membership activities at a health club facility where the NED is installed. These applications can gather information on exercise devices to assist health club personnel to determine when to perform maintenance, whether to purchase additional exercise devices, and what types and quantity of additional exercise devices to purchase. The applications can also be used to transmit special messages from the health club to a specific user such as payment of dues, marketing of membership bonus programs currently available, or other specific communications.

Data collection module 220 includes a set of routines that gather real time information from exercise device 204 related to a user's exercise regimen as well as information on Internet access. Routines in data collection module 220 provide an application programming interface (API) for exercise equipment applications 218 and generate information suitable for transmission over bus 214 through network interface 212. For example, this can include opening specific TCP/IP ports over the Internet to transmit data as well as packaging information into objects compatible with an object-oriented program language such as Java. In one implementation, data collection module 220 includes client and server routines that execute on NEDs and servers such as NED local server 102 and NED regional server 108 respectively.

Electronic commerce and security module 222 provides routines useful in transacting business over the Internet and securing the corresponding information with suitable encryption safeguards. These routines include obtaining keys for public-private key encryption as well as controlling the download of software from trusted sources on the Internet. This module also includes order forms for gathering personal information useful in electronic commerce such as name, shipping address, credit card information, and purchase order information and transporting the gathered information using security mechanisms like secure-socket layer (SSL).

Reliability module 224 simplifies managing a large number of NEDs connected to a network. Routines in reliability module 224 gather usage information on an NED to schedule preventative maintenance on the NED and troubleshoot problems as they arise. In addition, reliability module 224 also includes specialized routines that monitor operation of the NED and reset the NED as appropriate. Additional information on resetting the NED is discussed in further detail below.

Content manager module 226 determines what content is displayed on touch panel display 205 to the user. Content includes text, images, and multimedia information that may be of interest to the user. Using various processes described below, content can be selectively displayed according to personal characteristics of a user and marketing criteria outlined by vendors of specific products or services. Content manager module 226 also controls the download of multimedia files over network 11 through network interface 212 for storage on a database located on secondary storage 210.

Run-time environment 228 manages various resources on the NED to execute modules in memory 202 and control operation of exercise device 204. Accordingly, run-time environment 228 can be a real-time operating system or a traditional general-purpose operating system such as MS-DOS, Windows, or UNIX.

Figure 3:
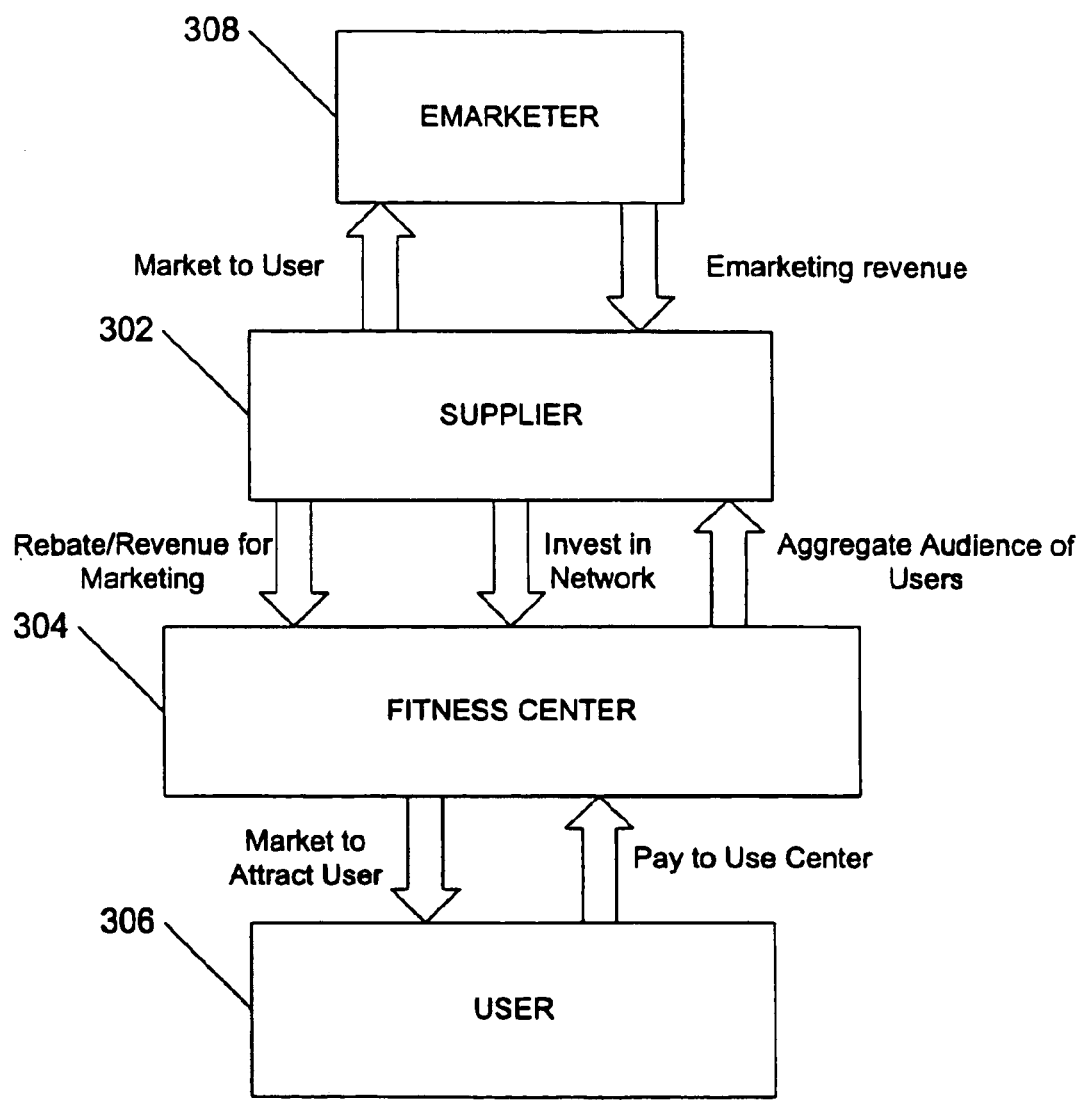
FIG. 3 is a flow chart diagram illustrating the market dynamics created between the NED, fitness centers, e-marketers, and fitness customers using the device.

FIG. 3 is a flowchart diagram illustrating the market dynamics created using NEDs in a fitness center. The NED alters the traditional business models used by fitness centers whereby the purchase of exercise equipment is offset by the sale of memberships. This paradigm shift in fitness center operations can be attributed, in part, to the generation of e-marketing revenue and providing easy access to the Internet. In general, e-marketing includes at least three different forms of valuable business opportunities: advertising specific products and services over the Internet to develop name recognition and strong branding; using the Internet for direct marketing and encouraging a user to take immediate action in the purchase of a product or service over the Internet; and company sponsorship campaigns for the purpose of getting a user to access a particular web-service providing additional content or information. These powerful e-marketing opportunities combine the impact of television, the targeting capabilities of direct mail, and the interactivity of the Internet. On a large scale, a network of NEDs provides a platform for traditional marketing and e-marketing opportunities, all of which can be customized using demographic and psychographic information.

In this business model, supplier 302 invests in the equipment, infrastructure and services required to integrate and connect exercise equipment to the network as NEDs. Netpulse Commuications, Inc. of San Francisco, Calif. is one company that operates as supplier 302 and supplies the equipment, infrastructure and services required to establish NEDs in various fitness centers throughout numerous geographic regions. Supplier 302 can also include a company that manufactures exercise equipment already equipped with processors and network connectivity for accessing the Internet.

This business model is a "sponsor media customer model" because network sponsorship money raised through e-marketing offsets the capital investment necessary to purchase, integrate, and/or manufacture NEDs. In one implementation, supplier 302 supplies equipment infrastructure to fitness center 304 priced according to the estimated usage by users 306. Fitness center 304 attracts and retains additional users 306 to its facility by providing exercise equipment having Internet access (NEDs) and value-added applications for use with the NEDs. By attracting and retaining additional users 306, the fitness centers generate additional revenue. Further, the NEDs can also be used to justify the higher dues in more upscale centers even though the center does not specifically charge for their usage.

In return, fitness center 304 allows e-marketers to provide e-marketing to users 306. For example, fitness center 304 allow the display of sponsorship information, advertising, and direct marketing campaigns on the NEDs used by users 306 in their facilities. As e-marketing revenue 308 increases, those parties providing exercise equipment network infrastructure such as Netpulse Communications, Inc. offset the equipment costs and begin generating profits. If fitness center 304 meets or exceeds estimated user usage levels, it may also obtain larger rebates on the equipment or, in some cases, share in the e-marketing revenue received by exercise equipment supplier 302.

Figure 4A:
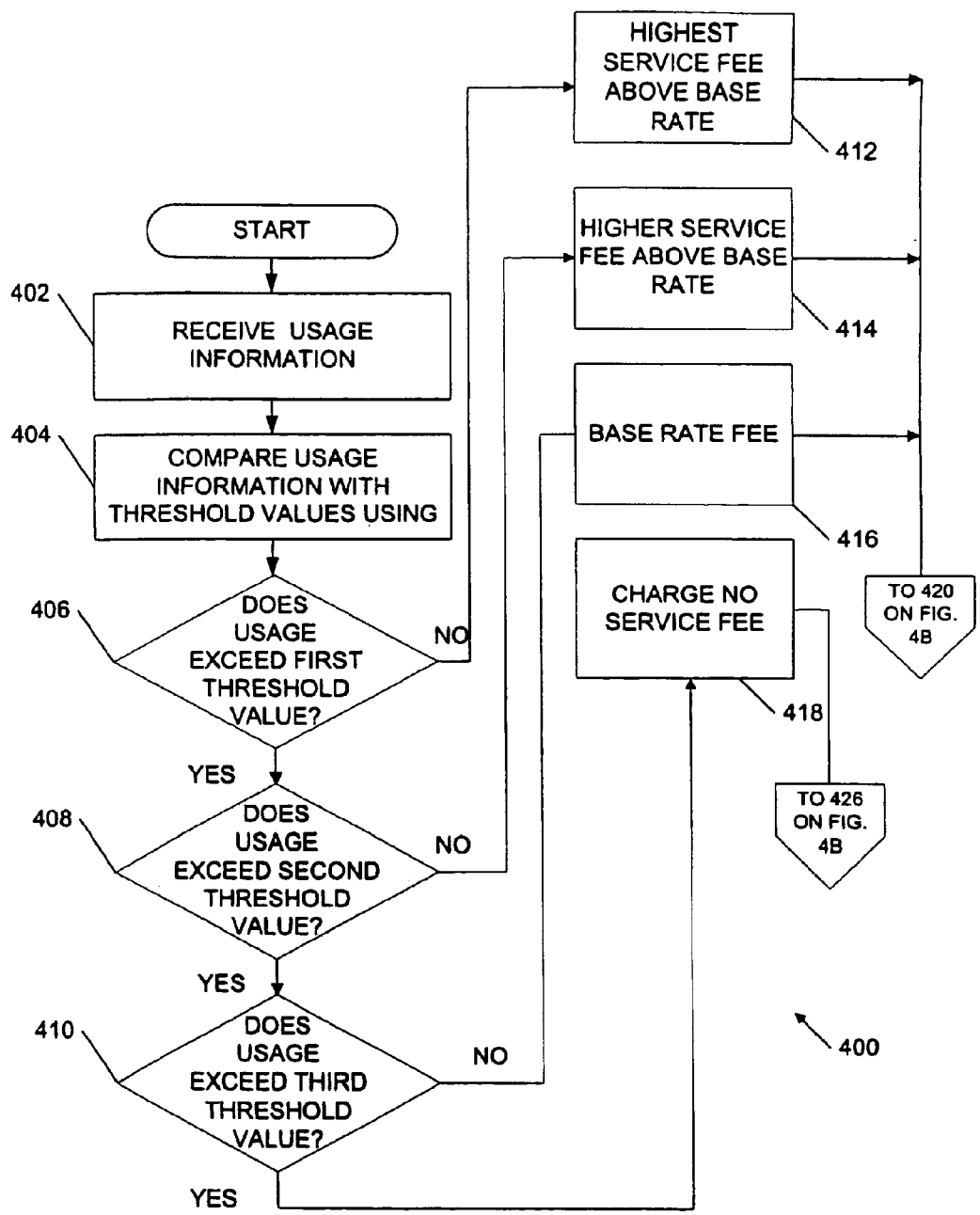
FIG. 4 is a flow chart diagram of the operations associated with formulating the cost associated with the NED.
Figure 4B:
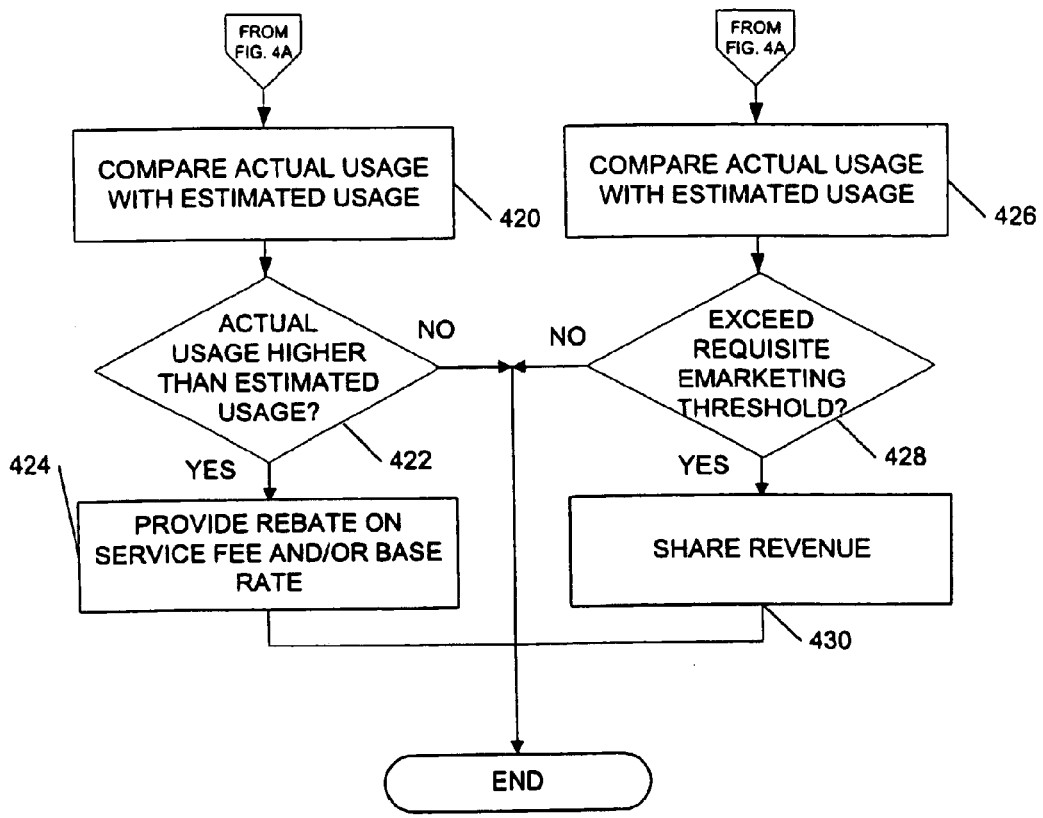

FIGS. 4A and 4B are flowchart diagrams of the operations associated with formulating the price of a NED. Usage-based pricing of equipment is important as it enables fitness centers to justify installing new equipment that would otherwise require a large capital outlay or large periodic payments. Instead, the e-marketing revenue streams generated indirectly by users operating a network of the NEDs offset these costs. For example, e-marketing revenues are generated when e-marketers pay for various e-marketing campaigns and through users participating in e-commerce transactions while operating the NEDs.

A usage pricing method as described herein is one of the many exercise equipment applications 218 depicted in FIG. 2. In FIG. 4A, usage pricing method 400 receives usage information (step 402). In one implementation, each fitness center gathers specific usage information manually by gathering statistical information on either, its overall facility such as total members, total exercise equipment and total member visits per day, or its specific fitness members' typical exercise regimen or by surveying the user population at the fitness center. This type of information can be gathered by the fitness center on a regular basis such as daily, monthly, bi-annually, annually, or as deemed necessary by the parties involved. This information on actual usage is provided to supplier 302 and used directly to determine the price of the NED. The price of the NED can include the periodic service fee charged to the fitness center operating the exercise equipment as well as any purchase costs associated with purchasing the NED.

Another implementation uses the Internet and the World Wide Web to collect data from fitness centers. Using a customized survey available on the web, operators of fitness centers provide statistical information on the fitness center described above and request a corresponding quote for the NEDs. This statistical information is processed by a computer program that automatically determines pricing information for the NEDs as described in further detail below.

In another implementation, the usage level of the exercise equipment is estimated from prior usage information, information related to the members using the NED and the operation of the facility and specific exercise equipment. Prior usage information from the fitness center is gathered, for example from a survey on the Internet, to determine if there is an increasing trend or a decreasing trend in the future usage of the NED. Future usage levels are predicted by combining either the fitness facility's data with a historical model based on other NED installations, or demographic trend information with statistical information about the members using the exercise equipment in the facility. The statistical information relates to age, sex, weight, education, income level, and geographic location. For example, increasing usage levels of the NED in the fitness center combined with an increase in the number of females in the fitness center can be used to estimate the future actual usage levels of the NED over time. In general, the predictive power of this approach depends not only on the accuracy of the information but the appropriateness of the model used to process and interpret the information.

Usage levels of the NED can also be predicted by periodically measuring and generating a set of metrics from the statistical information. These metrics corresponding to information such as age, sex, weight, education, income level, and geographic location can be used to estimate usage. Other metrics can also be included if they are useful in identifying future users of the exercise equipment and a frequency in which they are likely to exercise.

Alternatively, usage information can also be gathered in real-time by monitoring the NEDs installed in each fitness center and collecting the information in a central location such as NED regional server 108. Real-time collection of usage information has the advantages of being accurate without requiring additional work from the fitness center. It also provides objective information on the usage of the NED. The usage information includes statistical information related to the operation of both the overall exercise facility and the specific exercise equipment in the facility. If the facility does not already have NEDs installed, usage information related to conventional exercise equipment can be utilized and extrapolated for estimating usage of the NEDs.

To determine how much the NED is to be discounted, usage pricing method 400 compares the usage with one or more threshold values (step 404). If usage does not exceed a first threshold value (step 406) then a fitness center may be charged the highest service fee rate above the base rate in the pricing schedule (step 412). However, if the usage exceeds a first threshold value but does not exceed a second threshold value (step 408) then the fitness centers may be charged only a higher service fee above the base rate (step 414). Finally, if the usage exceeds a second threshold value but does not exceed a third threshold value (step 410) then the fitness center will be charged a base rate with no service fee (step 416). Finally, if the usage exceeds a third threshold value (step 410) the fitness center will not be charged either a base rate or service fee for the NED (step 418).

Threshold values used to compare against usage information include a frequency the users operate an exercise device; the duration or length of time the user operates the exercise equipment; the frequency a user views e-marketing content, and the absolute number of users using the NED. For example, the viewing frequency threshold can be compared with the frequency a user views e-marketing content on the display device of the NED while exercising.

Fitness centers can also reduce costs associated with NEDs if the actual usage exceeds the initial estimated or projected usage provided by the fitness center. Referring to FIG. 4B, fitness centers charge a base rate and service fee in steps 412, 414, and 416 can receive rebates on the periodic fees they are charged. Usage pricing method 400 compares actual usage with estimated or projected usage (step 420) and if the actual usage is higher, (step 422) a rebate for a portion of the periodic fee charged to the fitness center is provided (step 424).

A similar scheme is applied to fitness centers whose estimated usage exceeds the threshold for charging no base rate or service fee (step 418). In these fitness centers, actual usage is also compared with estimated usage in FIG. 4B (step 426). If actual usage exceeds a requisite e-marketing threshold (step 428) then these fitness centers can potentially share a revenue generated from the various e-marketing activities (step 428). In some cases, this e-marketing threshold may need to be set higher, for example, if profit margins on the e-marketing are small or relatively low compared to the NED cost. Using this pricing model, fitness equipment used by these latter fitness centers shifts from becoming a capital expenditure to becoming a source of revenue.

Figure 5:
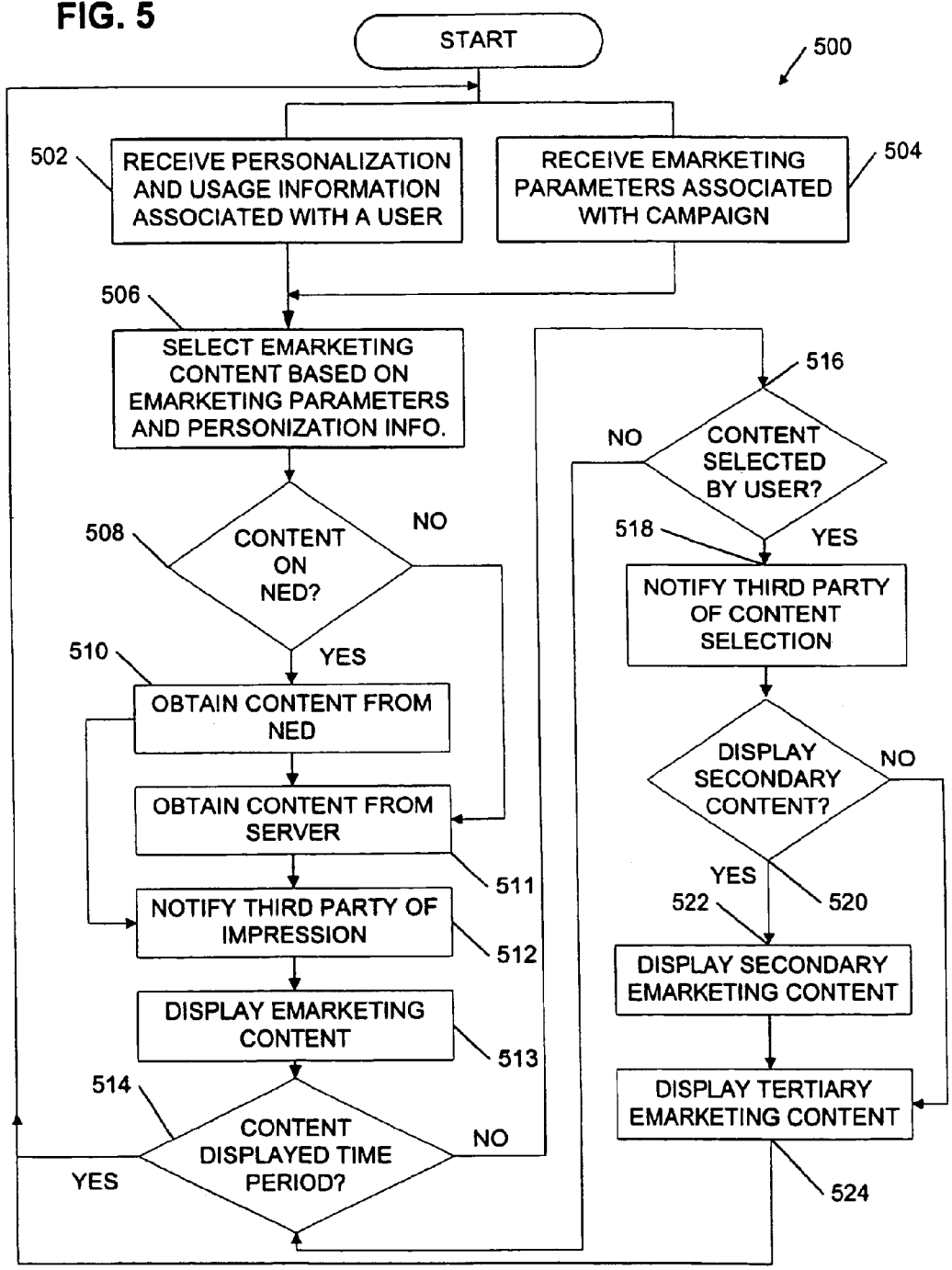
FIG. 5 is a flow chart diagram of the operations associated with customizing the content delivered to a display device on the NED.

FIG. 5 is a flowchart diagram of the operations associated with customizing content delivered to a display device on a network-enabled exercise device (NED). Content customization process 500 receives personalization and usage information for a user (step 502) and receives e-marketing parameters associated with the e-marketing campaign (step 504). For example, personalization and usage information can include age, weight, height, demographics, psychographics, and any other information useful in customizing content.

E-marketing parameters are determined by the e-marketers and correspond to users with specific personalization and usage information. For example, e-marketing parameters can be used to target a specific user audience having a certain specific combination of demographic and/or psychographic characteristics such as income level, gender, and interest specific sporting activities.

Content customization method 500 selects appropriate e-marketing content by comparing the personalization and usage information with the e-marketing parameters set by the e-marketers (step 506). Once the e-marketing information is selected, the location of the e-marketing content must be determined. If e-marketing content is not already stored on the NED (step 508) then e-marketing content is obtained from a LAN or WAN Internet server such as a computer with a large storage device (step 511). If the e-marketing content is on the NED (step 508) then e-marketing content is obtained directly from a storage device associated with the NED (step 510). In both cases one or more third-parties are notified that an impression of the e-marketing content has been made (step 512) and e-marketing content is displayed on a display device (step 513). These third parties can include, a company running the e-marketing campaign, a third party audit company, or a third party serving the content.

The e-marketing content is displayed for a predetermined period of time (step 514) at which point the process is repeated. If a user selects the e-marketing content before this predetermined time period elapses (step 516) then a third-party is notified that the content has been selected (step 518).

Once a user has selected content, secondary content may also be displayed such as TV commercials, movies, and other advertisements. Specifically, content customization method 500 determines if the secondary content is available for display (step 520) before actually displaying the secondary content (step 522) or potentially even tertiary content associated with the secondary content (step 524). Although only three types of displays are mentioned multiple types of content can be added as needed under the circumstances. For example, additional content can be chained together that increasingly focuses the user on a specific product or service. The content includes video and audio clips provided in a number of different formats such as banner advertisements, web pages, pop-up displays, and other types of content. Alternatively, if no secondary or additional content is available or if content customization method 500 is programmed not to display such additional content, the display process is complete. This process of displaying e-marketing content on the display device of the NED repeats as long as the user operates the NED.

Figure 6:
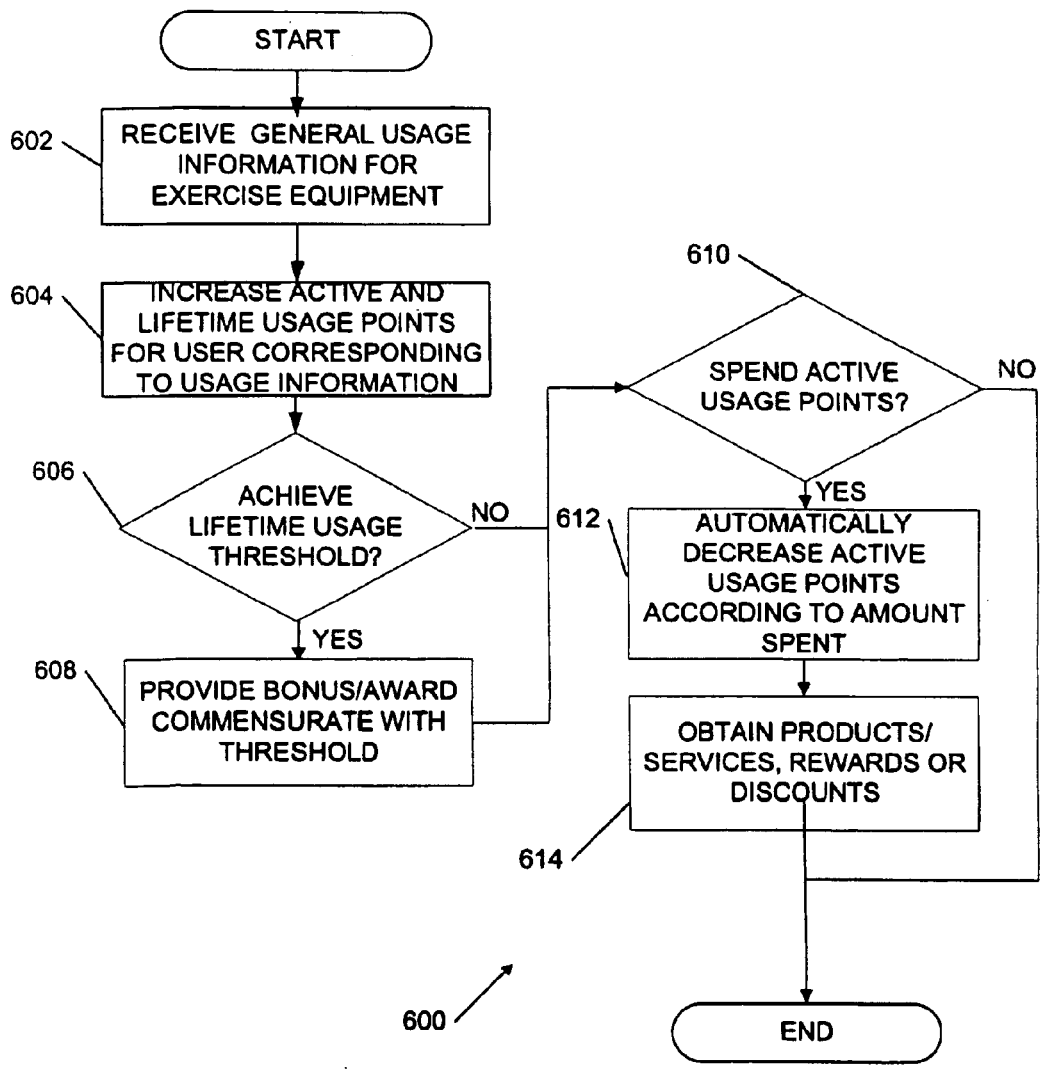
FIG. 6 is a flow chart diagram of the operations associated with providing incentives to users operating the NED.

FIG. 6 is a flowchart diagram of the operations associated with providing incentives for users to operate the NED. This includes providing users with both active and lifetime usage points for using the NED over a period of time. Active usage points are usage points accrued incrementally for each additional period of time a user operates the NED. For example, an active usage point can be awarded for each additional mile a user operates a bicycle-type NED. Active usage points encourage each user to operate the NED for increasingly longer periods of time during each workout.

In contrast, lifetime usage points are used to encourage each user to return to the fitness center's NED over a longer period of time such as months or years. The lifetime usage points represent the aggregate total time a user has worked out on various pieces of NEDs. Unlike active usage points, lifetime usage points cannot be spent and therefore generally increase over time and continuous usage. The lifetime usage points can be used to categorize users into higher categories for receiving bonuses and promotions. For example, riding an exercise bicycle 1000 measured miles over a period of one year or less can qualify a user for 1000 lifetime usage points and eligibility for larger bonuses or awards. These bonuses or awards can be discounts to the fitness center or can be tangible products such as workout gear, exercise equipment, or other incentives.

In operation, incentive award process 600 receives general usage information corresponding to a particular user (step 602). This information can be gathered in real-time from the NED or can be gathered manually at the fitness center and entered into a database such as NED database 109 connected to NED regional server 108.

Incentive award process 600 processes the general usage information and increases the active and lifetime usage points for the user (step 604). If the users lifetime usage point totals exceeds one or more predetermined milestones/threshold levels (step 606) then the user is provided a bonus/award commensurate with the specific milestone level (step 608). For example, if a users lifetime usage points exceeds 1000 units then a user can be placed in a "gold" program where every additional active usage point earned receives double credit.

Incentive award process 600 also allows a user to spend active usage points on a variety of goods and services. In one implementation, the user utilizes electronic-commerce (e-commerce) available on the NED to use the active usage points. In an additional implementation, the user can use the active usage points in e-commerce transactions from other devices other than the NED such as a personal computer, personal digital assistant (PDA), or even a cell-phone device. These devices can be operated at home, work or a mobile setting and used to access a web site on the Internet configured to exchange the active usage points with goods, services, and other forms of currency.

If the user decides to spend active usage points (step 610) then incentive award process 600 automatically decreases active usage points according to the amount the user spends (step 612). The user then obtains products/services, rewards or discounts on products as a result of the transaction (step 614). Alternatively, if the user chooses not to spend any active usage points, the user simply accrues the usage points to spend at a later point in time.

Fitness centers can also customize incentive award process 600 for special promotions and marketing campaigns. For example, incentive award process 600 can award additional usage points for frequent visitors of the fitness center. This type of program would award users additional points for visiting the fitness center on a regular basis in addition to awarding usage points for operating the exercise equipment. To promote use of the NED during low-utilization periods in the fitness center (e.g. 2:00 P.M. on Sundays), incentive award process 600 can be programmed to provide additional active usage points to users operating the NED during this slow time period.

Figure 7:
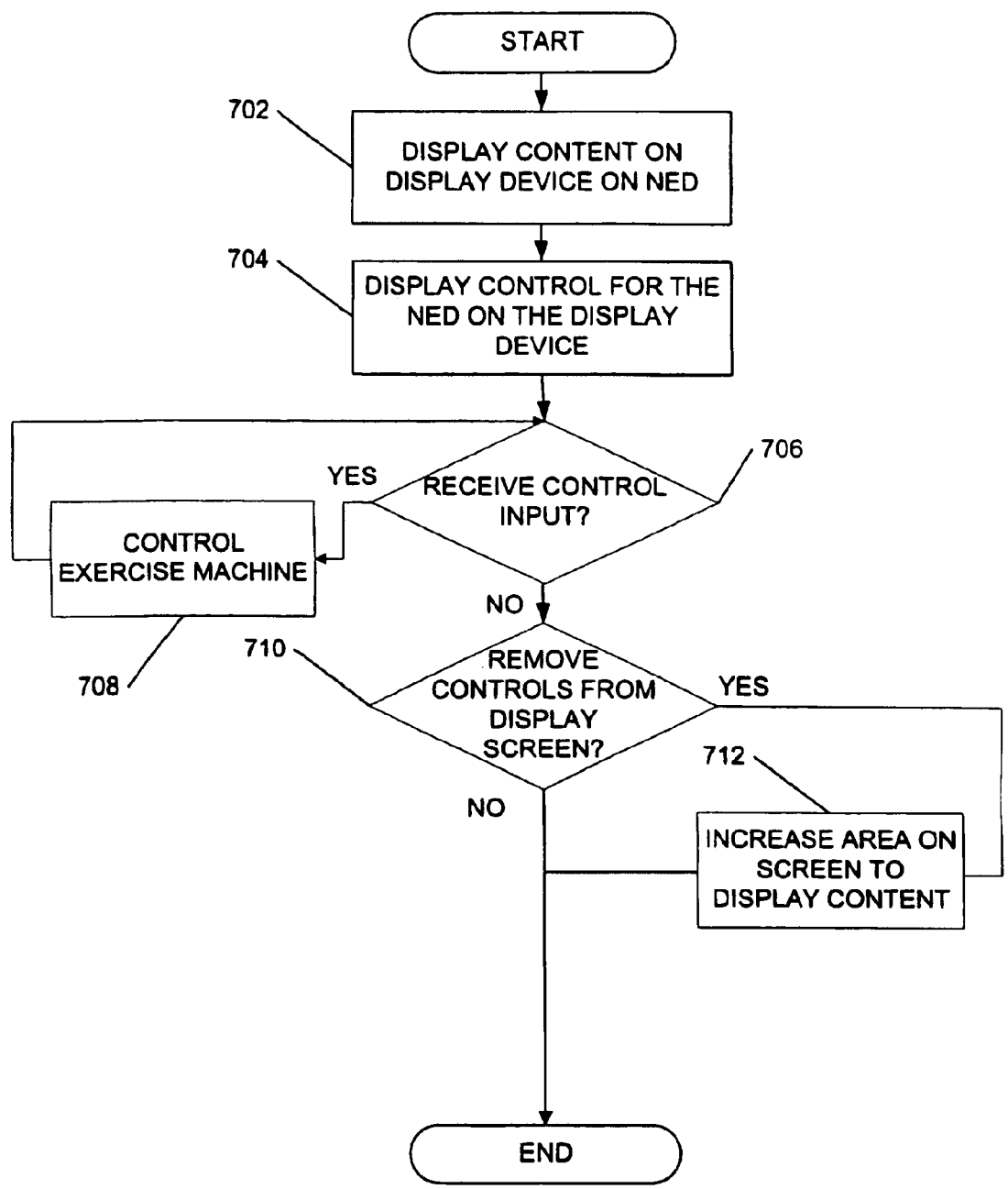
FIG. 7 is a flow chart diagram of the operations used to control a graphical user interface designed to work with the NED.

FIG. 7 is a flowchart diagram of the operations used to control a graphical user interface (GUI) for use with a NED. The GUI is an important aspect of the NED as it defines the users experience while exercising on and operating the NED. Initially, the GUI displays content on the display device of the NED (step 702). This content can include various e-marketing information such as advertisements, direct-marketing opportunities, and sponsorships as well as information not strictly classified as e-marketing content such as content available in newspapers, commercial publications, bulletin boards, Internet newsgroups and information sent through emails.

The GUI also displays controls for accessing the Internet and controlling the NED through the display device (step 704). These controls can be used to operate the NED as well as configure the users profile used in conjunction with the NED. For example, these controls can be used to set the duration of the exercise session and the difficulty setting on the NED. The controls can also be used to customize the users profile including personal information such as age, weight, height, target pulse rate, and target calories.

In one implementation, a first portion of the display device is partitioned to display content and a second portion of the display device is partitioned to display one or more controls for controlling the exercise device. Selectable elements on the display device receive input from the user and control operation of the exercise device. In one implementation, a touch-screen displays one or more buttons that the user touches to control operation of the exercise device. GUI receives control input (step 706) and passes this control information on to control the exercise machine (step 708). If the user input is not to control the exercise device, it can be to modify the configuration of the GUI. For example, the user may request the GUI to remove the controls for the exercise machine from the display screen. If the user touches the proper selectable element on the display screen to remove controls (step 710) then the GUI removes controls from the display screen and increases the area on the display screen to display content (step 712).

Selectable elements such as buttons used to control the exercise device can be placed in a border portion of the display device. These controls are removed from the display device by sliding the border portion like a drawer into the outer edge of the display whereby they disappear from view. Meanwhile, the content in the first portion of the display device is increased to occupy that portion along the border where the controls were originally displayed.

Figure 11:
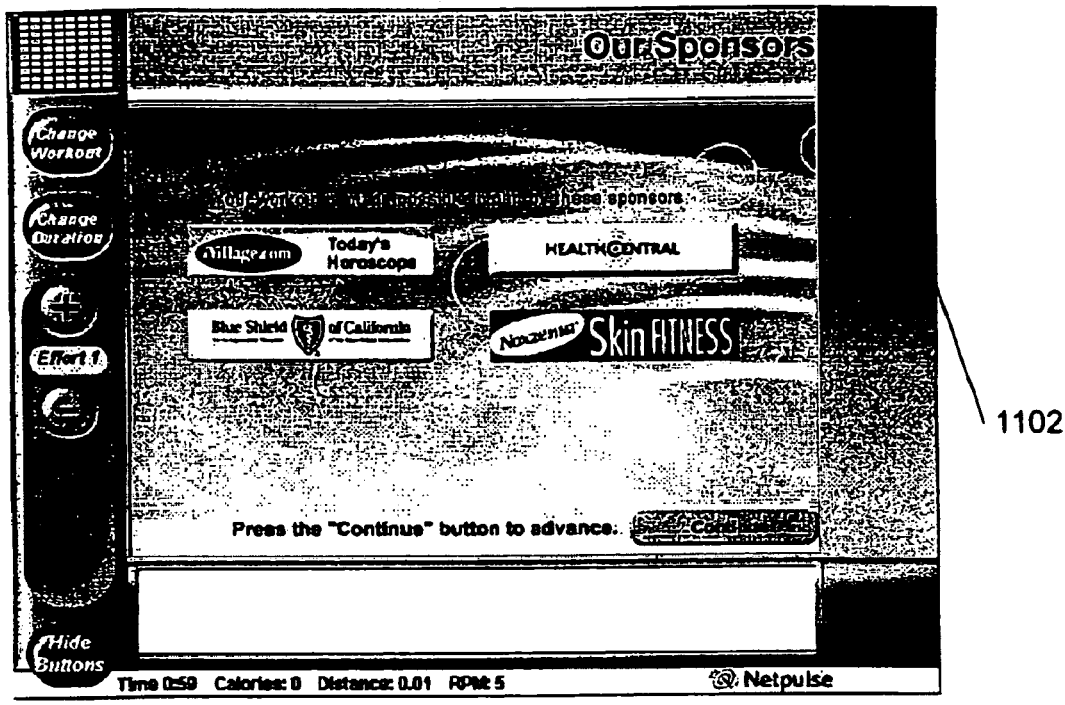
FIG. 11 includes screen images depicting aspects of the graphic user interface used with the NED.
Figure 11:
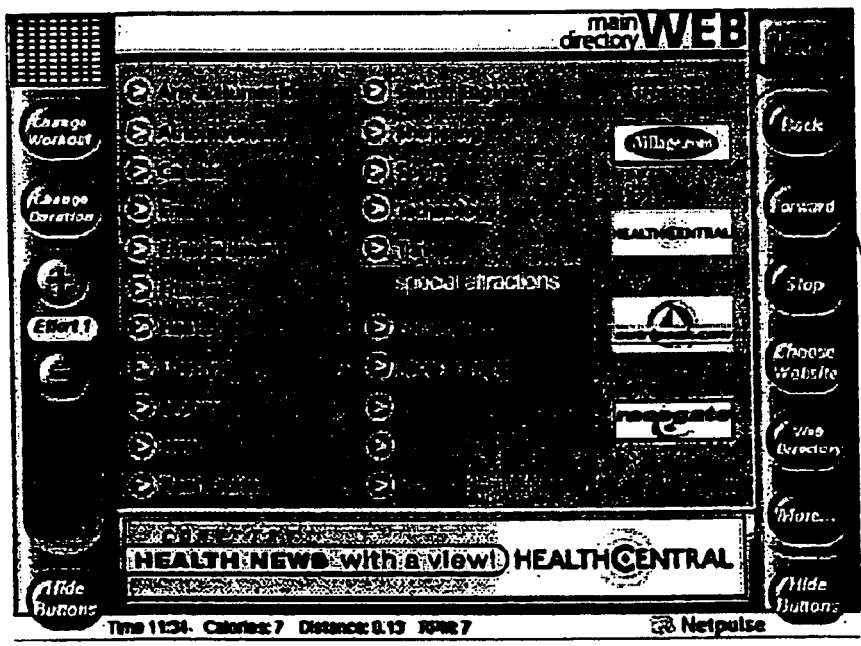

Interface 1102 and interface 1104 in FIG. 11 illustrate an exemplary GUI consistent with the present invention. Interface 1102 depicts a GUI with controls in a first portion on the left-hand border and content in a second portion in the field of the display. Interface 1104 depicts a GUI having a second portion with controls on both the left and right borders of the display and content in the field portion of the display.

In both examples, the bottom section of interface 1102 and 1104 displays advertisements and/or e-marketing related information. By placing the advertisements and/or e-marketing information adjacent to meters displaying information important to the user while working out, it is more likely that the advertisement information will be considered or possibly "clicked on". For example, a user checking metered information such as the duration of the workout or the calories burned during the work out invariably will also consider the advertisements placed near the meter values and as a result may engage in an e-commerce transaction.

Figure 8:
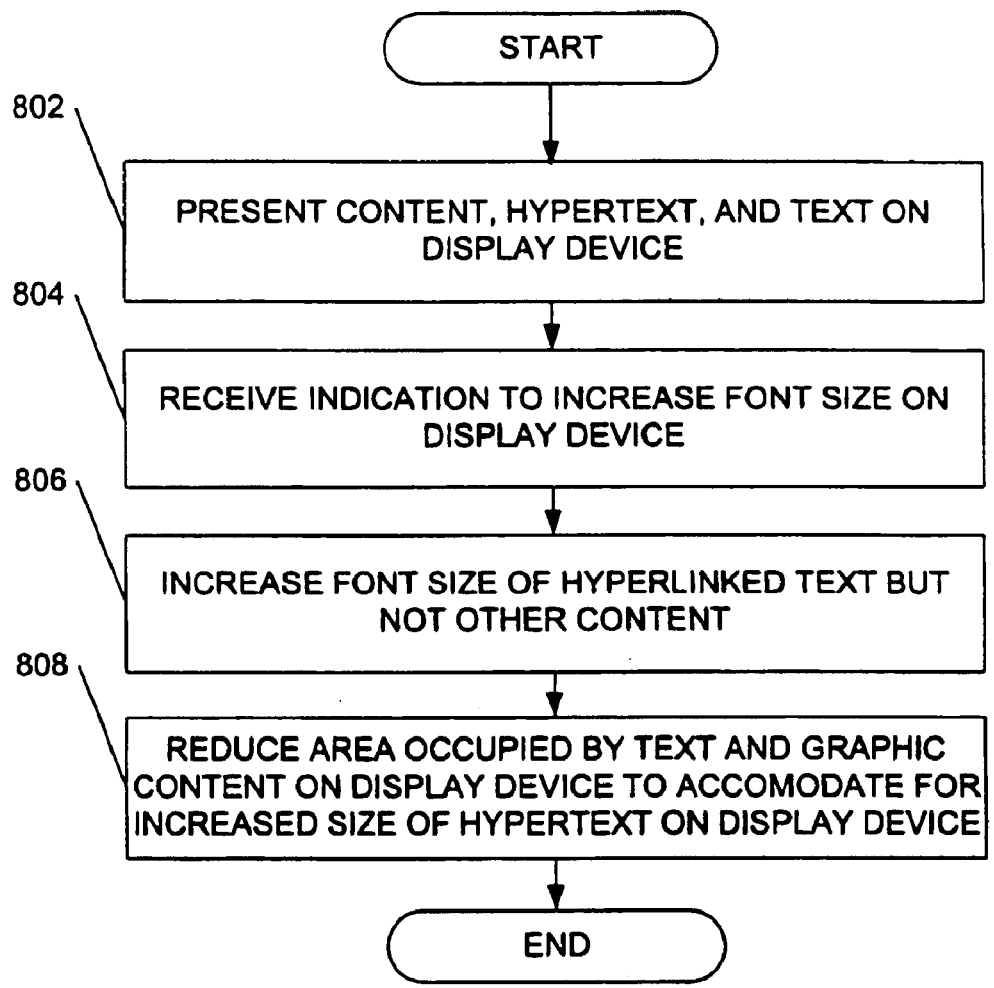
FIG. 8 is flow chart diagram of the operations that control display of selectable elements on the display device of the NED.

FIG. 8 is a flowchart diagram of the operations that control display of selectable elements on the display device the NED. Selectable elements displayed on the display device on the NED are modified for ease of use by users of an exercise device. This user interface provides a combination of graphic content, hypertext, text, video, audio, and other types of information on the display device (step 802). As needed, the user interface scales bit map graphic information and hypertext links such that they can be readily displayed together on the display device.

At the user's discretion, the interface receives an indication to increase the font size used for displaying hypertext and other selectable elements on the display device (step 804). By increasing the font size of hypertext and other selectable elements, the user is able to select these elements with greater ease while exercising on the NED.

The interface increases the font size of hypertext and other selectable elements on the display but not other content displayed on the display device (step 806). By increasing the font size of the selectable elements independent of the graphic images, the user can read hypertext more easily and thereby facilitate easier selection of the selectable elements containing text. For example, increasing the font size of hyperlinked text is increased but the adjacent images are not increased in size and/or resolution. As necessary, user interface can also reduce the area occupied by the text and graphic content on the display device that is not selectable (step 808). This accommodates for the increased size of hypertext and other selectable elements on the display device.

Figure 9:
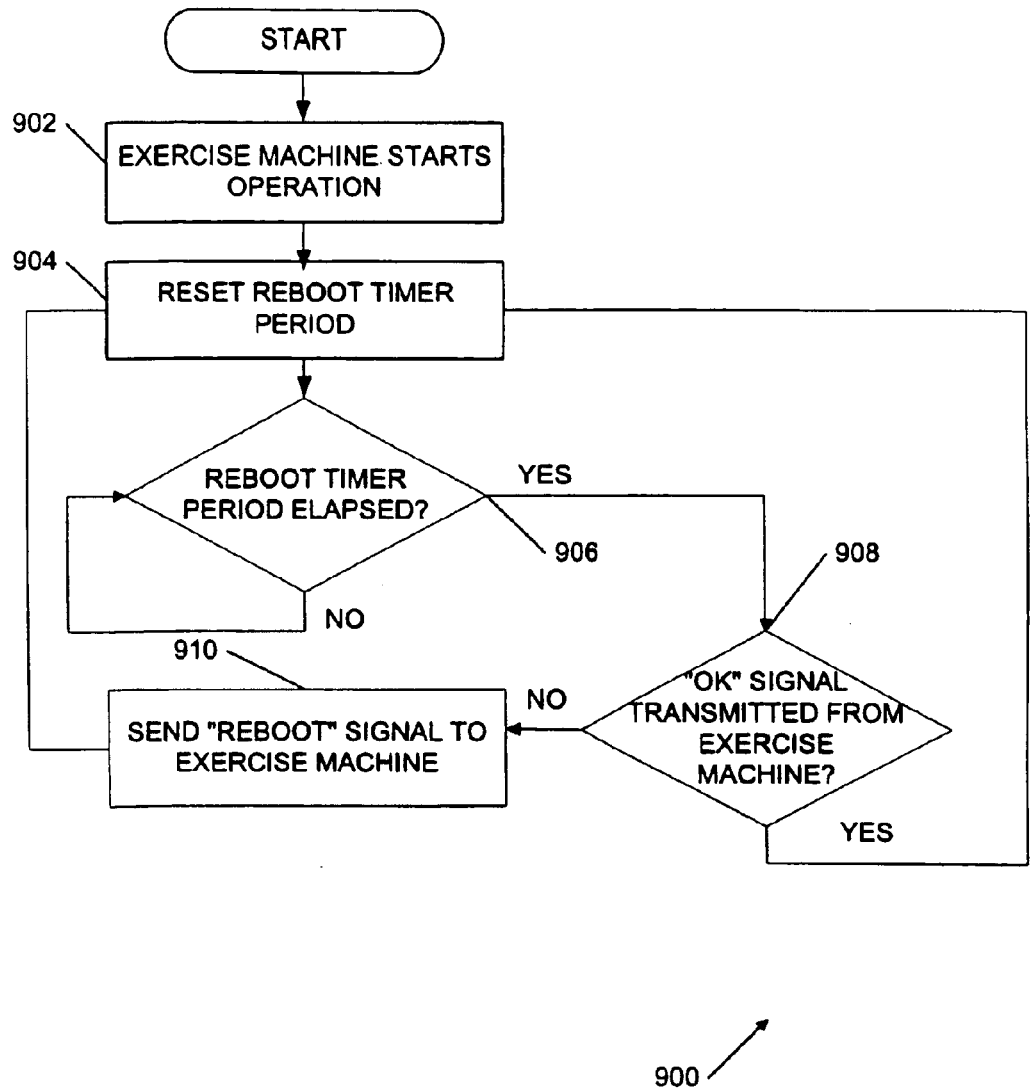
FIG. 9 is a flow chart diagram of the operations used to selectively reset one or more of the NEDs.

FIG. 9 is a flowchart diagram of the operations used to selectively reset one or more NEDs on a network. This method of selectively resetting NEDs improves the reliability/up-time and reduces the amount of administration necessary to manage these devices in an environment such as a fitness center with few information technology personnel.

Each NED starts operation when the device is powered on (step 902). Powering on each device can include providing power to the exercise portion of the device as well as providing power to the processor portion of the device used to access the Internet and control operation of the exercise device. A reboot timer is reset to a predetermined time period (step 904). The reboot timer begins counting down units of time immediately after being reset. For example, a reboot timer may be reset to count down 300 seconds. The reboot timer communicates with the NED over a input-output interface yet operates as a separate device from the NED to ensure proper reset of the NED when necessary.

A selective reset process 900 determines at a predetermined interval if the reboot timer period has elapsed (step 906). This predetermined time period is less than the time set in the reboot timer. If the reboot timer has elapsed, selective reset process 900 determines if an "ok" signal has been transmitted from the NED (step 908). If the "ok" signal was transmitted from the NED, then the reboot timer period is reset to the predetermined time period (step 904) and the selective reset process 900 is repeated. Alternatively, if the "ok" signal has not been transmitted, selective reset process 900 sends a "reboot" signal to processor causing it to reset. In one implementation, the NED transmits an "ok" signal in a command string transmitted over a serial port connected to an embedded processor executing selective reset process 900. The command string contains a one character command optionally followed by a four character datafield. The embedded processor executing selective reset process 900 reads the characters off the serial port and performs the operation specified in FIG. 9.

Figure 10:
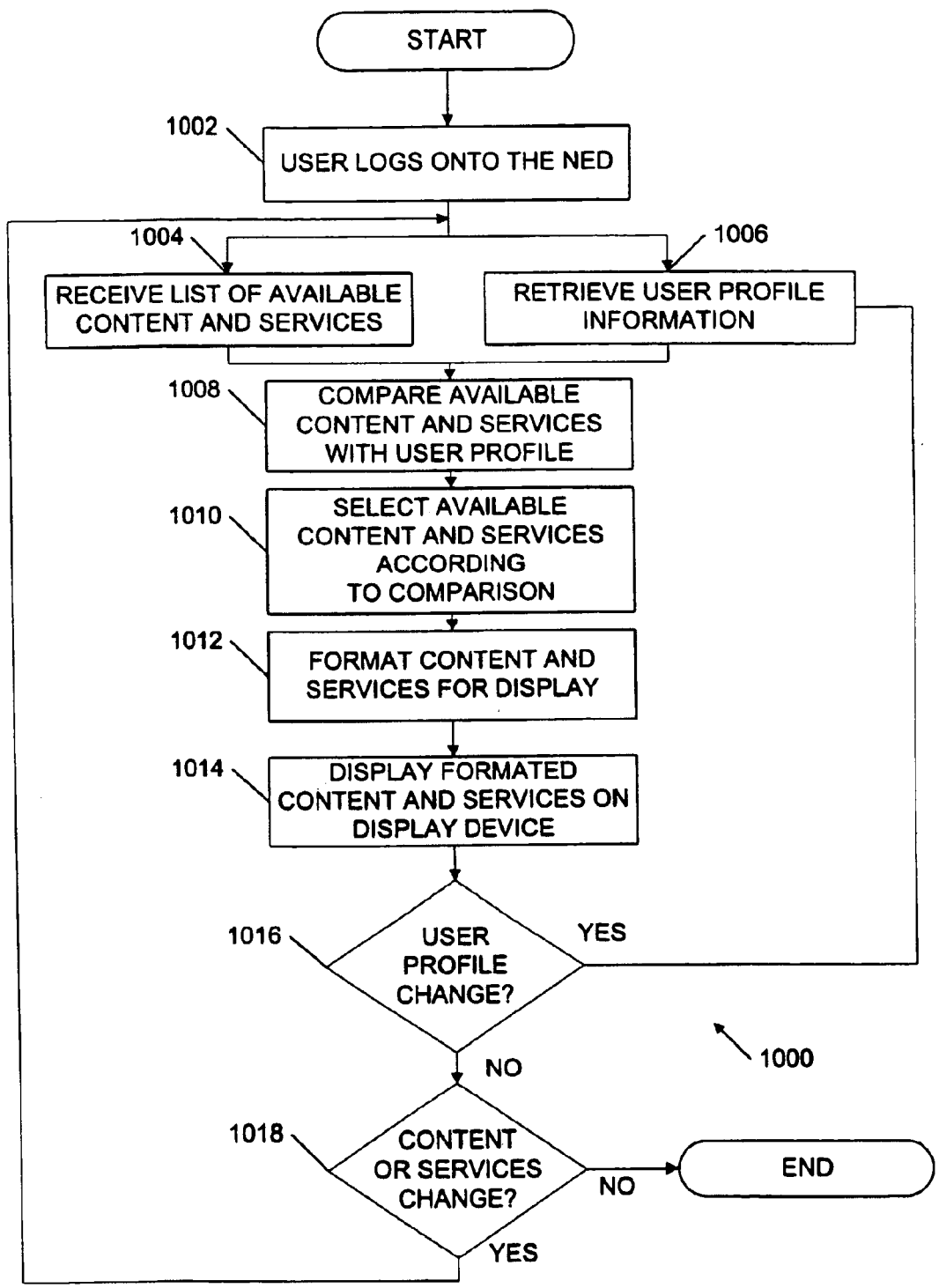
FIG. 10 is a flow chart diagram of the operations to deliver customized content on the NED.

FIG. 10 is a flowchart diagram of the operations used to deliver customized content on a NED. These operations are used to customize the interface a user sees according to user profile information describing the user and the list of available content and services being provided to the NED. A user logs into the NED with a login and password combination (step 1002). The NED may request the user enter user profile information into the system the first time the user logs in. Alternatively, the user may also update existing user profile information with details about the user such as age, weight, gender, and other vital statistics. In addition to helping customize content, this information can be used in association with using the NED.

Once logged in, the NED then retrieves user profile information (step 1006) stored either locally on a storage device on the NED or over a network and receives a list of available content and services (step 1004). Custom content process 1000 compares available content and services with parameters in the user profile (step 1008). For example, information on the user profile relating to age, sex, income and other personal characteristics may be used in this comparison.

These values are compared with corresponding metrics defined by the content and service providers according to the markets they are interested in targeting. Accordingly, custom content process 1000 then selects available content and services based on the comparisons (step 1010). At this step, custom content process 1000 selects content and services that most closely matches the user profile information. Custom content process 1000 then formats the content and services for display on the display device (step 1012). For example, FIG. 11 shows interface 1102 and interface 1104 with content customized for a particular user. Specifically, interface 1102 includes several advertisements that may be of interest to the particular user on the NED. Similarly, categories of information on interface 1104 are also selected because of the potential interest in the user operating the NED.

If the user profile changes over time (step 1016) this process is repeated and the content is customized according to those changes. Further, if content or services change over time (step 1018) the process is also repeated again whereby new content or services are also selected.

Figure 12:
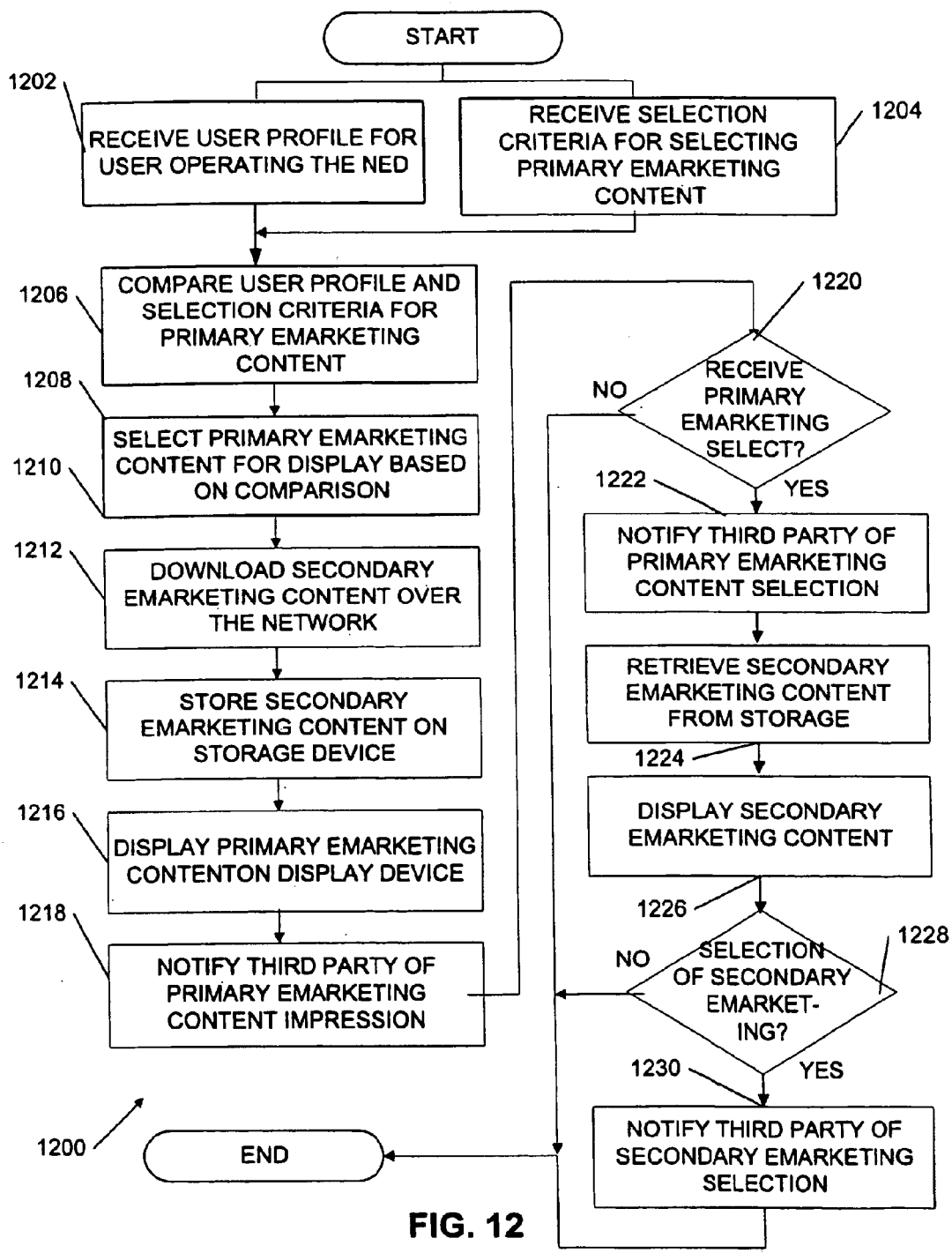
FIG. 12 is a flow chart diagram of the operations to select a secondary advertisement on a network-enabled exercise device.

FIG. 12 is a flowchart diagram of the operations used for generating customized e-marketing content on the display device of a NED. Unlike the pure content the user may subscribe to and read every day, e-marketing content includes information being advertised or pitched to the user as a potentially interesting product or service the user should purchase. Accordingly, customizing the e-marketing content also has advantages that customized content also provides. For example, customizing e-marketing content improves the effectiveness of e-marketing campaigns by providing a user with a secondary, tertiary, and additional e-marketing content related to a selected primary e-marketing content. Multiple levels of related content allow the e-marketing campaigns to further focus the user on a particular product or service being offered.

At first, custom advertisement process 1200 receives a user profile for the user operating the NED (step 1202) and receives selection criteria for selecting an e-marketing content (step 1204). The user profile and selection criteria for the e-marketing campaign are compared (step 1206). For example, user profile information includes demographics, psychographics, historical actions, and current actions. Demographics include such information such as gender, age, height, weight, and income. Psychographic information includes information on personal interests and activities such as sports and entertainment. Historical actions address actions a user has taken in the past such as their workout regimen and websites visited on the Internet while operating the NED. User profile information also includes current actions reported in real-time such as watching particular sports events on TV, listening to classical music from a radio station on the Internet, identifying where the user is geographically located, and determining the time of day as the user is exercising.

Selection of the primary e-marketing content is made according to the comparison (step 1208). The specific selection criteria for the primary e-marketing content generally depends on specific campaigns designed by the e-marketers. The selection criteria developed from these campaign descriptions include user targeting information and various campaign metrics for measuring the efficacy of the advertisements. Once the primary advertisements are selected, custom e-marketing process 1200 also downloads secondary and if appropriate tertiary e-marketing content in preparation for subsequent display of the content (step 1212). To obviate download delay times for the user, the secondary and tertiary content can be downloaded and stored on each NED at night while the user is not operating the NED. Secondary e-marketing content is stored on a storage device such as on a hard-disk on the NED or a server connected to the network. Custom e-marketing process displays e-marketing content on the display device of the NED (step 1216) meanwhile a third-party is notified the primary e-marketing content impression was presented to a user(step 1218). If the user does not select the primary e-marketing content this process is repeated with a new primary e-marketing content (step 1220).

However, if the user selects a primary e-marketing content (step 1220), a third-party is notified that the primary e-marketing content has been selected (step 1222) and custom advertisement process 1200 retrieves a secondary e-marketing content from storage on the NED (step 1224). This secondary e-marketing content is then displayed on the display (step 1226). For example, a secondary e-marketing content can include a high-impact "TV commercial" presented on the display device or interactive question and answer application for the user to inquiry more information on the particular product or service.

If the user then selects the secondary e-marketing content (step 1228) then custom advertisement process 1200 notifies a third-party that the secondary advertisement has also been selected (step 1230). Alternatively, if the user does not select the secondary e-marketing content, custom advertisement process 1200 repeats the overall steps with a new set of primary and secondary advertisements.

A number of embodiments of the invention have been described. Nevertheless, it will be understood that various modifications may be made without departing from the spirit and scope of the invention.

What is claimed is:

1. A method of presenting customized content to a consumer on a network-enabled exercise device, comprising:
   providing an exercise device having a display console, the exercise device being connected to a network;
   receiving user profile information associated with a consumer operating the exercise device;
   receiving content information identifying available content for display on the display console, the content information including selection criteria for selecting content to be displayed from the available content;

selecting content for display to the consumer based on the content information and the user profile information; and presenting an impression of the selected content to the consumer on the display console.

2. The method of claim 1, wherein the user profile information includes demographic information about the consumer selected from the group of characteristics including age, gender, weight, height, income level, education level and geographic location.

3. The method of claim 1, wherein the user profile information includes psychographic information about the consumer identifying the consumer's personal interests.

4. The method of claim 1, wherein the user profile information includes historical information relating to the consumer's operation of one or more network-enabled exercise devices.

5. The method of claim 1, wherein the user profile information includes current information relating to the consumer's present operation of a network-enabled exercise device.

6. The method of claim 1, wherein the available content includes e-marketing service information.

7. The method of claim 6, wherein the e-marketing service information is selected from Web-based banner advertisements, Web-based content and service sponsorship information, and Web-based direct marketing information.

8. The method of claim 6, wherein the selection criteria include e-marketing campaign information specifying one or more characteristics of an intended target consumer of an e-marketing campaign.

9. The method of claim 8, wherein the e-marketing campaign information includes one or more parameters selected from the group of parameters including, age, sex, weight, height, income level, education level, geographic location, time of day, a user's historical information, a user's current information, and a user's special interests.

10. The method of claim 6, wherein the selection criteria include e-marketing campaign metrics specifying one or more characteristics of an intended e-marketing campaign.

11. The method of claim 10, wherein the e-marketing campaign metrics include one or more parameters selected from the group of parameters including total number of impressions presented in a specified period, frequency of presentation of each impression to the consumer, total price of an e-marketing campaign based on a price and quantity of impressions presented, and quality of impact derived from the nature of the impression presented.

12. The method of claim 1, further comprising:
notifying a third-party that the impression of the selected content has been presented to the consumer.

13. The method of claim 1, further comprising:
receiving a user input in response to the impression of the selected content; and
communicating the user input to a third party.

14. The method of claim 13, wherein the user input includes a selection of e-marketing service information from the impression of the selected content.

15. The method of claim 14, further comprising:
presenting an impression of secondary content to the consumer in response to the user input, the secondary content including detailed information relating to the selected e-marketing service information.

16. The method of claim 15, wherein the secondary content is retrieved over the network and is presented to the consumer through a web-site from the World Wide Web.

17. The method of clam 1, wherein the user profile information is stored in memory when the consumer registers to use the network-enabled exercise device.

18. The method of claim 1, wherein the available content includes control information for controlling the operation of the exercise device.

19. The method of claim 1, wherein the available content includes monitor information for monitoring a workout on the exercise device.

20. The method of claim 1, wherein the available content includes a directory of content selectable by the consumer.

21. The method of claim 1, wherein the available content includes information selected from the group of categories including arts and humanities, automotive, careers, email, entertainment, fitness, health, lifestyle, money, news, real estate, search engines, shopping, sports, technology, and travel.

22. The method of claim 1, wherein the available content includes content selected from the group including text, hypertext links, buttons, graphics, messages, audio information, video information, HTML, logos and branding.

23. A computer program product on a computer-readable medium for presenting customized content to a consumer on a network-enabled exercise device having a display console, the program comprising instructions operable to cause a programmable processor to:
receive user profile information associated with a consumer operating the exercise device;
receive content information identifying available content for display on the display console, the content information including selection criteria for selecting content to be displayed from the available content;
select content for display to the consumer based on the content information and the user profile information; and
present an impression of the selected content to the consumer on the display console.

24. The computer program of claim 23, wherein the user profile information includes demographic information about the consumer selected from the group of characteristics including age, gender, weight, height, income level, education level and geographic location.

25. The computer program of claim 23, wherein the user profile information includes psychographic information about the consumer identifying the consumer's personal interests.

26. The computer program of claim 23, wherein the user profile information includes historical information relating to the consumer's operation of one or more network-enabled exercise devices.

27. The computer program of claim 23, wherein the user profile information includes current information relating to the consumer's present operation of a network-enabled exercise device.

28. The computer program of claim 23, wherein the available content includes e-marketing service information.

29. The computer program of claim 28, wherein the e-marketing service information is selected from Web-based banner advertisements, Web-based content and service sponsorship information, and Web-based direct marketing information.

30. The computer program of claim 28, wherein the selection criteria include e-marketing campaign information specifying one or more characteristics of an intended target consumer of an e-marketing campaign.

31. The computer program of claim 30, wherein the e-marketing campaign information includes one or more parameters selected from the group of parameters including, age, sex, weight, height, income level, education level, geographic location, time of day, a user's historical information, a user's current information, and a user's special interests.

32. The computer program of claim 28, wherein the selection criteria include e-marketing campaign metrics specifying one or more characteristics of an intended e-marketing campaign.

33. The computer program of claim 32, wherein the e-marketing campaign metrics include one or more parameters selected from the group of parameters including total number of impressions presented in a specified period, frequency of presentation of each impression to the consumer, total price of an e-marketing campaign based on a price and quantity of impressions presented, and quality of impact derived from the nature of the impression presented.

34. The computer program of claim 23, further comprising instructions operable to cause a programmable processor to:

notify a third-party that the impression of the selected content has been presented to the consumer.

35. The computer program of claim 23, further comprising instructions operable to cause a programmable processor to:

receive a user input in response to the impression of the selected content; and communicate the user input to a third party.

36. The computer program of claim 35, wherein the user input includes a selection of e-marketing service information from the impression of the selected content.

37. The computer program of claim 36, further comprising instructions operable to cause a programmable processor to:

present an impression of secondary content to the consumer in response to the user input, the secondary content including detailed information relating to the selected e-marketing service information.

38. The computer program of claim 37, wherein the secondary content is retrieved over the network and is presented to the consumer through a web-site from the World Wide Web.

39. The computer program of clam 23, wherein the user profile information is stored in memory when the consumer registers to use the network-enabled exercise device.

40. The computer program of claim 23, wherein the available content includes control information for controlling the operation of the exercise device.

41. The computer program of claim 23, wherein the available content includes monitor information for monitoring a workout on the exercise device.

42. The computer program of claim 23, wherein the available content includes a directory of content selectable by the consumer.

43. The computer program of claim 23, wherein the available content includes information selected from the group of categories including arts and humanities, automotive, careers, email, entertainment, fitness, health, lifestyle, money, news, real estate, search engines, shopping, sports, technology, and travel.

44. The computer program of claim 23, wherein the available content includes content selected from the group including text, hypertext links, buttons, graphics, messages, audio information, video information, HTML, logos and branding.

45. An apparatus for presenting customized content to a consumer on a network-enabled exercise device, comprising:

an exercise device having a display console, the exercise device being connected to a network;

means for receiving user profile information associated with a consumer operating the exercise device;

means for receiving content information identifying available content for display. on the display console, the content information including selection criteria for selecting content to be displayed from the available content;

means for selecting content for display to the consumer based on the content information and the user profile information; and means for presenting an impression of the selected content to the consumer on the display console.

* * * * *